(12) United States Patent
Baker et al.

(10) Patent No.: US 10,581,570 B2
(45) Date of Patent: Mar. 3, 2020

(54) METHOD FOR ASSISTING DATA TRANSMISSION ON A FIRST CARRIER BY INDICATING A TERMINATION POINT OF DATA TRANSMISSION

(71) Applicant: Alcatel Lucent, Nozay (FR)

(72) Inventors: Matthew P. J. Baker, Canterbury (GB); Sigen Ye, Whitehouse Station, NJ (US); Teck Hu, Melbourne, FL (US); Shin Horng Wong, Chippenham (GB); Feng Han, Shanghai (CN); Mohammad R. Khawer, Lake Hopatcong, NJ (US)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/534,256

(22) PCT Filed: Nov. 7, 2014

(86) PCT No.: PCT/CN2014/090540
§ 371 (c)(1),
(2) Date: Jun. 8, 2017

(87) PCT Pub. No.: WO2016/070397
PCT Pub. Date: May 12, 2016

(65) Prior Publication Data
US 2017/0353277 A1 Dec. 7, 2017

(51) Int. Cl.
*H04W 72/04* (2009.01)
*H04L 5/00* (2006.01)
(Continued)

(52) U.S. Cl.
CPC ............ *H04L 5/0048* (2013.01); *H04L 5/001* (2013.01); *H04L 5/0053* (2013.01);
(Continued)

(58) Field of Classification Search
CPC ... H04L 5/0048; H04L 27/0006; H04L 5/001; H04W 72/042
See application file for complete search history.

(56) References Cited

U.S. PATENT DOCUMENTS 8,929,303 B2 * 1/2015 Wang ................. H04B 7/15507
370/315
9,648,500 B2 * 5/2017 Chen ..................... H04W 16/14
(Continued)

FOREIGN PATENT DOCUMENTS

| WO | WO 2014/067488 A1 | 5/2014 |
| WO | WO 2014/069601 A1 | 5/2014 |
| WO | WO 2014/077607 A1 | 5/2014 |

OTHER PUBLICATIONS

International Search Report for PCT/CN2014/090540 dated Jul. 17, 2015.

*Primary Examiner* — Lan-Huong Truong
(74) *Attorney, Agent, or Firm* — Fay Sharpe LLP

(57) ABSTRACT

A method is provided for assisting data transmission on a first carrier by indicating a termination point of data transmission in a transmitting device and apparatus thereof, wherein the method comprises the steps of: A. transmitting data on the carrier to a receiving device in a first subframe; and B. transmitting downlink control information to the receiving device; wherein the downlink control information includes a termination point indication for indicating a termination point of the data in the first subframe. The method and apparatus could improve the utilization of subframe and transmission capacity, and enable LTE to satisfy the regulations for unlicensed operation with high spectral efficiency.

18 Claims, 2 Drawing Sheets

(51) Int. Cl.
   *H04L 27/00* (2006.01)
   *H04W 72/12* (2009.01)

(52) U.S. Cl.
   CPC ........ *H04L 5/0096* (2013.01); *H04L 27/0006* (2013.01); *H04W 72/042* (2013.01); *H04W 72/1289* (2013.01)

(56) References Cited

U.S. PATENT DOCUMENTS

| | | |
|---|---|---|
| 2010/0080139 A1 | 4/2010 | Palanki et al. |
| 2012/0320840 A1 | 12/2012 | Kim et al. |
| 2013/0114573 A1* | 5/2013 | Suzuki .................. H04L 1/1887 370/336 |
| 2013/0142175 A1* | 6/2013 | Manssour ......... H04W 72/1252 370/336 |
| 2013/0272261 A1* | 10/2013 | Seo ...................... H04J 11/0056 370/329 |
| 2014/0086112 A1* | 3/2014 | Stern-Berkowitz .......................... H04W 72/1289 370/280 |
| 2014/0119275 A1* | 5/2014 | Kim ...................... H04L 5/0023 370/315 |
| 2014/0328295 A1* | 11/2014 | Ko ....................... H04L 5/0053 370/329 |
| 2015/0103715 A1* | 4/2015 | Chen .................... H04W 76/15 370/311 |
| 2015/0245376 A1* | 8/2015 | Bashar .................... H04L 1/18 370/277 |
| 2017/0142741 A1* | 5/2017 | Kaur .................... H04W 76/18 |

\* cited by examiner

METHOD FOR ASSISTING DATA TRANSMISSION ON A FIRST CARRIER BY INDICATING A TERMINATION POINT OF DATA TRANSMISSION

FIELD OF THE INVENTION

The application relates to a wireless communication field, and particularly to a method for assisting data transmission on a first carrier by indicating a termination point of data transmission and apparatus thereof.

BACKGROUND OF THE INVENTION

In LTE Licensed-Assisted Access (LAA), an LTE carrier operating in unlicensed spectrum is aggregated with an LTE carrier in licensed spectrum. The subframe boundaries on the unlicensed carrier would typically be aligned with those on the licensed carrier.

Before data transmission can take place on the unlicensed carrier, regulations in some parts of the world require that a Clear Channel Assessment (CCA) or Extended CCA (ECCA) procedure is carried out to sense the channel to determine that it is free of transmissions from other devices. If the (E)CCA carried out by a device determines that the channel is free, the device may commence transmission immediately.

Further regulations in some parts of the world impose a restriction on the maximum length of transmission time by a given device (e.g. 4 ms). Currently in LTE, data transmissions always terminate at a subframe boundary, since there is no mechanism to indicate any other termination point. However, with subframes having a duration of 1 ms, up to 25% of the available transmission time may not be utilized in each transmission opportunity if data transmissions have to terminate at the last subframe boundary before 4 ms after the start of transmission.

A mechanism is therefore needed to enable data transmissions to terminate part way through a subframe.

OBJECT AND SUMMARY OF THE INVENTION

In view of technical problem mentioned above, it would be desirable to achieve a solution for assisting data transmission on a first carrier by indicating a termination point of data transmission.

To achieve the purpose of the invention, a first aspect of the invention proposes a method for assisting data transmission on a first carrier by indicating a termination point of data transmission in a transmitting device, wherein the method comprises the steps of: A. transmitting data on the carrier to a receiving device in a first subframe; and B. transmitting downlink control information to the receiving device; wherein the downlink control information includes a termination point indication for indicating a termination point of the data in the first subframe.

Advantageously, the step (B) further comprises: transmitting the downlink control information to the receiving device on a second carrier.

Advantageously, a subframe for transmitting the downlink control information is aligned with the first subframe.

Advantageously, the step (B) further comprises: transmitting the downlink control information to the receiving device on the first carrier in the first subframe.

Advantageously, the termination point indication includes an indicator for indicating a symbol index of the termination point of the data in the first subframe.

Advantageously, each value represented by the indicator corresponds to a symbol index of possible termination point according to a mapping relationship configured in advance by higher-layer signaling or predetermined specification.

Advantageously, the possible termination point is located not before a reference signal designed for demodulation of the data.

Advantageously, the indicator comprises a 1-bit flag for indicating whether the data terminates at the mid-point of the first subframe or continues until the end of the first subframe.

Advantageously, the termination point indication comprises a postamble signal transmitted immediately after the termination point of the data in the first subframe.

Advantageously, the downlink control information further comprises an indication of a size of the data block transmitted, wherein the indication of a size is derived from a first table of sizes if the termination point indication indicates a termination point prior to the end of the sub-frame and a second table of sizes otherwise;

Advantageously, the downlink control information further comprises an indication of a size of the data block transmitted, wherein the indication of a size is derived from a second table of sizes and a scaling factor if the termination point indication indicates a termination point prior to the end of the sub-frame and the second table of sizes otherwise.

Advantageously, the transmitting device is a base station and the receiving device is a user equipment.

A second aspect of the invention proposes an apparatus for assisting data transmission on a first carrier by indicating a termination point of data transmission in a transmitting device, wherein the apparatus comprises: a first transmitting unit configured to transmit data on the carrier to a receiving device in a first subframe; and a second transmitting unit configured to transmit downlink control information to the receiving device; a DCI unit configured to generate the downlink control information; wherein the downlink control information includes a termination point indication for indicating a termination point of the data in the first subframe.

Advantageously, the DCI unit further comprises: a determining module configured to determine a value for a symbol index of the termination point of the data in the first subframe according to a mapping relationship configured in advance by higher-layer signaling or predetermined specification.

In summary, the inventive methods and apparatus could improve the utilization of subframe and transmission capacity, and enable LTE-Unlicensed to satisfy the regulations for unlicensed operation with high spectral efficiency. Besides, the solution in this invention has greater competitiveness in accessing the channel.

BRIEF DESCRIPTION OF THE DRAWINGS

The invention is explained in further detail, and by way of example, with reference to the accompanying drawings wherein.

Throughout the above drawings, like reference numerals will be understood to refer to like, similar or corresponding features or functions.

DETAILED DESCRIPTION

The following particular description of preferred embodiments will be given with reference to the drawings constituting a part of the invention. The drawings exemplarily illustrate particular embodiments, in which the invention can be practiced. The exemplary embodiments are not intended to exhaust all the embodiments of the invention. As can be appreciated, other embodiments can be possible or structural or logical modifications can be made without departing from the scope of the invention. Thus the following detailed description is not intended to be limiting, and the scope of the invention will be defined as in the appended claims.

The main concept of the method in the invention is: when a transmitting device is required to transmit data (e.g. PDSCH data) on a first carrier (e.g. unlicensed carrier) to a receiving device, the transmitting device will send a termination point indication to the receiving device in DCI (downlink control information) message, such that the receiving device could know the termination point of the data and implement the corresponding demodulation, wherein the termination point indication is used for indicating a termination point of the data.

Based on the concept mentioned above, the invention further proposes a corresponding apparatus for assisting data transmission by a indicating termination point of data transmission in transmitting device. The apparatus comprises a first transmitting unit configured to transmit data, a second transmitting unit configured to transmit downlink control information and a DCI unit configured to generate the downlink control information, wherein the DCI unit further comprises a determining module.

Figure 1:
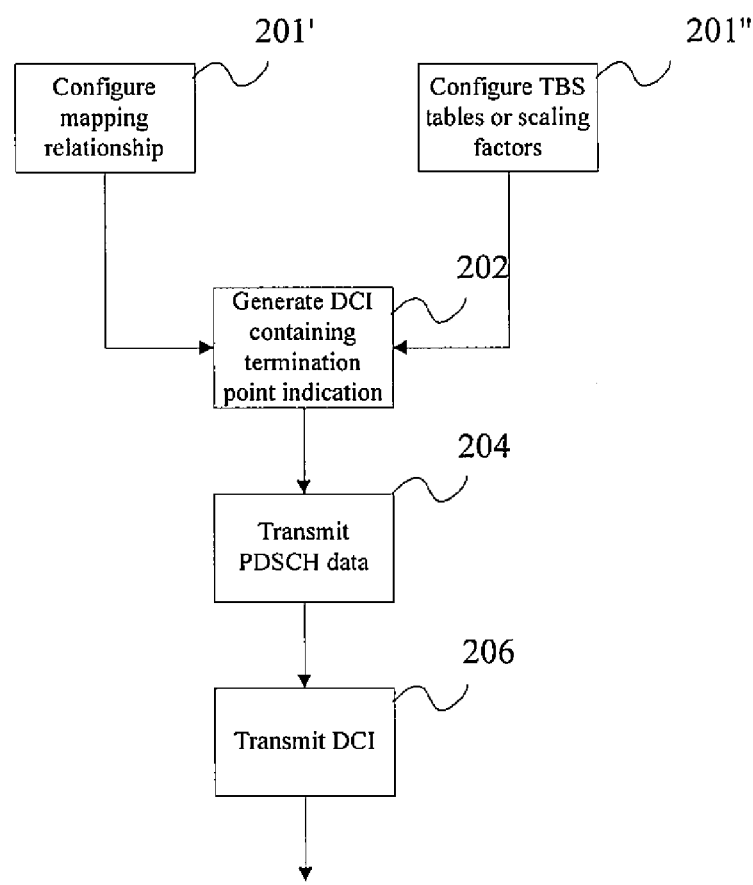
FIG. 1 illustrates a flow chart of a method for assisting data transmission on a first carrier by indicating a termination point of data transmission in accordance with this invention.

Hereinafter, the method for assisting data transmission by indicating a termination point of data transmission and apparatus thereof will be described in detail referring to FIG. 1.

In step 202, a DCI unit generates downlink control information containing a termination point indication for indicating a termination point of the data in a first subframe, wherein the termination point of the data is on the first subframe. In other word, the termination point of the data corresponds to one of symbols in the first subframe.

To be specific, when a transmitting device needs to transmit data to a receiving device on a first carrier (e.g. unlicensed carrier), the transmitting device is required to send downlink control information containing a termination point indication to the receiving device. In one embodiment, the downlink control information also contains transmission parameters of the data transmission (for example Physical Resource Block (PRB) resources, Modulation and Coding Scheme (MCS), transport block size (TBS)).

The termination point indication indicates a symbol index of the termination point of the data in the first subframe by an indicator. In one embodiment, each value represented by the indicator corresponds to a symbol index in the first subframe to indicate the termination point of the data. However, for a subframe with 14 symbols, it might need at least 4-bit for an indicator to represent all symbol indexes in a subframe if each symbol index is assigned to a value represented by indicator. Because not all of symbols are likely to be the termination point (for example, the first several symbols in the subframe hardly become the termination point), it means assignment for all symbols in the first subframe is not an optimal solution.

Therefore, in a preferred embodiment of this invention, we propose to assign a value represented by indicator only for those symbols which are likely to be the termination point. Such solution can improve the utilization of DCI resource. In order to implement this solution, a set of possible termination points should be configured in advance by higher-layer signalling or are predetermined by specification, and a mapping relationship between the symbol indexes of possible termination points and the value represented by the indicator also should be configured in advance by higher-layer signalling or are predetermined by specification. Therefore, before step 202, the method further comprise step 201'.

In step 201', a mapping relationship between the symbol indexes of possible termination points and the value represented by the indicator is configured in advance by higher-layer signalling or are predetermined by specification. According to the mapping relationship, a determining module in transmitting device may determine a value corresponding to a symbol index of practical termination point of the data in the first subframe. Correspondingly, after obtaining a value represented by the indicator, the receiving device may immediately determine a corresponding symbol index according to the mapping relationship.

In a preferred embodiment, such possible termination points could be the proximity of reference signals designed for demodulation of the data. For example, it might not be permitted to terminate the data transmission before the first demodulation reference signals in the subframe have been transmitted, so the possible termination points can be located not before a reference signal designed for demodulation of the data.

In another preferred embodiment, the only possible termination point is the mid-point of the subframe (a.k.a. the slot boundary); in this case, the indicator simply comprises a 1-bit flag, indicating whether the data transmission can be assumed to terminate at the slot boundary or to continue until the end of the subframe.

In the existing LTE specification, TBS is not explicitly signaled. Instead, it is derived based on the MCS, the number of PRBs and the pre-defined TBS tables. When there is a large variation in the number of OFDM symbols used for data transmission, the TBS should also depend on the number of OFDM symbols. Therefore, before step 202, the method further comprise step 201".

In step 201", a first table of sizes or a scaling factor is configured in advance by higher-layer signalling or is predetermined by specification. The first table of sizes or scaling factor should be shared with receiving device before data transmission.

In a preferred embodiment, the first table of sizes corresponding to different numbers of OFDM symbols of data is defined. The downlink control information further comprises an indication of a size of the data block transmitted, wherein the indication of a size is derived from the first table of sizes if the termination point indication indicates a termination point prior to the end of the sub-frame and a second table of sizes otherwise. The second table of sizes is the existing TBS table.

In a preferred embodiment, scaling factors for different numbers of symbols of data based on a second table of sizes (existing TBS table) are defined. A scaling factor can be applied to the second table of sizes for each value of the number of OFDM symbols. Different scaling factors can be used for different values of the number of OFDM symbols. Alternatively, the same scaling factor can be used for a set of values of the number of OFDM symbols (similar to the handling of DwPTS in LTE TDD). Correspondingly, the downlink control information further comprises an indication of a size of the data block transmitted, wherein the indication of a size is derived from a second table of sizes and a scaling factor if the termination point indication indicates a termination point prior to the end of the subframe and the second table of sizes otherwise.

In step 204, the first transmitting unit transmits data to the receiving device on a first carrier. It should be noted that the data will be transmitted from the $4^{th}$ symbols of the first subframe when the first 1-3 symbols is occupied by the PDCCH DCI message.

In a preferred embodiment, a postamble signal is transmitted immediately after termination of the data transmission, for example in a part of an OFDM symbol, one OFDM symbol, or multiple OFDM symbols. Therefore, the termination point indication further comprises a postamble signal transmitted immediately after the termination point of the data in the first subframe.

In step 206, the second transmitting unit transmits the downlink control information to the receiving device.

In a preferred embodiment, the downlink control information is transmitted on a second carrier (e.g. licensed carrier) by EPDCCH or PDCCH. Moreover, the subframe for transmitting the downlink control information is aligned with the first subframe.

In another preferred embodiment, the downlink control information is transmitted on PDCCH on the first carrier. Moreover, the subframe for transmitting the downlink control information is same as the subframe (first subframe) for transmitting the data.

In a preferred embodiment, the transmitting device is a base station and the receiving device is a user equipment.

In a preferred embodiment, the remaining OFDM symbols in a subframe after termination of data transmission may be used to schedule another user in the unlicensed band.

Hereinafter, the method for assisting data transmission by indicating termination point of data transmission will be described by the detailed embodiments referring to FIGS. 2 and 3

Figure 2:
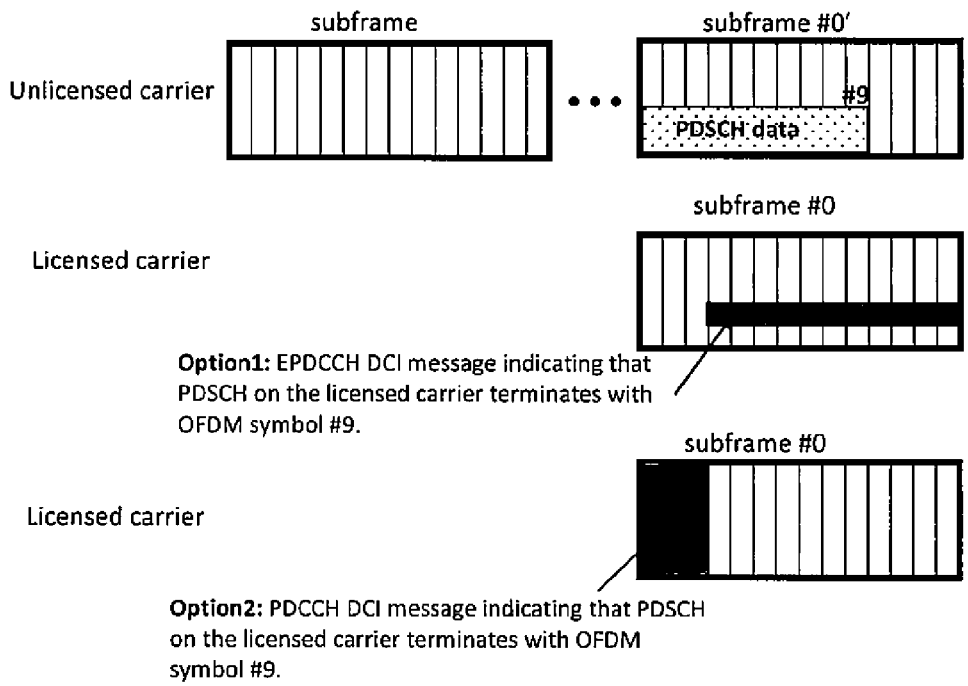
FIG. 2 illustrates a schematic view of a typical embodiment in accordance with this invention.

In a typical embodiment illustrated in FIG. 2, when a LTE eNB is required to transmit PDSCH data to a receiving UE, the LTE eNB will transmit a DCI message on EPDCCH or PDCCH in a subframe #0 on a first (e.g. licensed) carrier, wherein the DCI message indicates transmission parameters for a PDSCH data transmission in a subframe #0' on a second (e.g. unlicensed) carrier. The boundary of subframe #0 on the first carrier is aligned with the boundary of subframe #0' on the second carrier. The DCI message includes a termination point indication, which indicates the PDSCH data transmission will terminate with OFDM symbol #9 of the subframe #0'. At the same time, the LTE eNB transmits the PDSCH data on the second carrier and terminates it after OFDM symbol #9 of the subframe #0'. Correspondingly, the receiving UE will decode the DCI message and as a result discard the buffered PDSCH samples after OFDM symbol #9 in the subframe #0'. In such embodiment, the DCI message typically further includes a Carrier Indicator Field (CIF) for indicating an identifier of the carrier.

Figure 3:
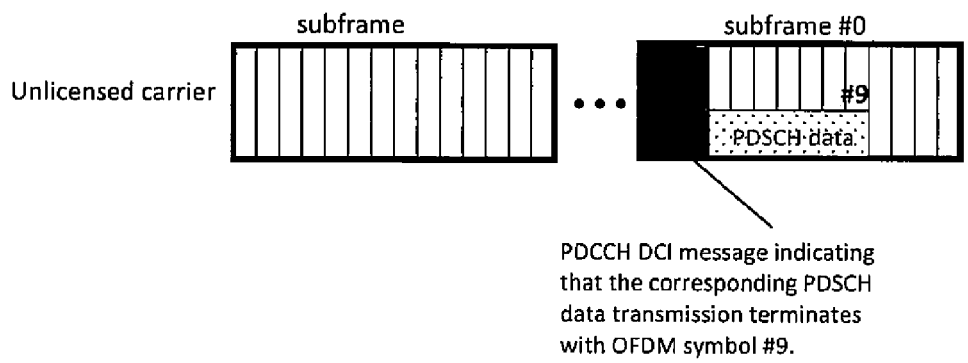
FIG. 3 illustrates a schematic view of another possible embodiment in accordance with this invention.

In another embodiment illustrated in FIG. 3, when a LTE eNB is required to transmit PDSCH data to a receiving UE, the LTE eNB will transmit a DCI message on PDCCH in a subframe #0 on a second (e.g. unlicensed) carrier so that the DCI message transmission could be completed within the first 3 OFDM symbols of the subframe, wherein the DCI message indicates transmission parameters for a PDSCH data transmission in the same subframe on the same carrier. The DCI message includes a termination point indication, which indicates the PDSCH data transmission will terminate with OFDM symbol #9. After transmitting the DCI message in the first 3 OFDM symbols, the LTE eNB transmits the PDSCH data in the same subframe and terminates it after OFDM symbol #9. Correspondingly, the receiving UE will decode the DCI message and as a result discard the buffered PDSCH samples after OFDM symbol #9 in the subframe #0. In such embodiment, the DCI message typically further includes a Carrier Indicator Field (CIF) for indicating an identifier of the carrier.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for assisting data transmission on a first carrier by indicating a termination point of data transmission in a transmitting device, wherein the method comprises:
   transmitting data on the carrier to a receiving device in a first subframe; and
   transmitting downlink control information to the receiving device;
   wherein the downlink control information includes a termination point indication for indicating a point within the first subframe and before a subframe boundary of the first subframe where the data in the first subframe terminates.

2. The method of claim 1, wherein the transmitting downlink control information to the receiving device further comprises:
   transmitting the downlink control information to the receiving device on a second carrier.

3. The method of claim 2, wherein a subframe for transmitting the downlink control information is aligned in time with the first subframe.

4. The method of claim 1, wherein the transmitting downlink control information to the receiving device further comprises:
   transmitting the downlink control information to the receiving device on the first carrier in the first subframe.

5. The method of claim 3, wherein the termination point indication includes an indicator for indicating a symbol index of the termination point of the data in the first subframe.

6. The method of claim 5, wherein each value represented by the indicator corresponds to a symbol index of possible termination points according to a mapping relationship configured in advance by higher-layer signaling or predetermined specification.

7. The method of claim 6, wherein the possible termination point is located not before a reference signal designed for demodulation of the data.

8. The method of claim 6, wherein the indicator comprises a 1-bit flag for indicating whether the data terminates at the mid-point of the first subframe or continues until the end of the first subframe.

9. The method of claim 1, wherein the termination point indication comprises a postamble signal transmitted immediately after the termination point of the data in the first subframe.

10. The method of claim 6, wherein the downlink control information further comprises an indication of a block size of the data transmitted, wherein the indication of the block size is derived from a first table of sizes if the termination point indication indicates a termination point prior to the end of the sub-frame and a second table of sizes otherwise.

11. The method of claim 6, wherein the downlink control information further comprises an indication of a block size of the data transmitted, wherein the indication of the block size is derived from a second table of sizes and a scaling factor if the termination point indication indicates a termination point prior to the end of the sub-frame and the second table of sizes otherwise.

12. The method of claim 6, wherein the transmitting device is a base station and the receiving device is a user equipment.

13. An apparatus for assisting data transmission on a first carrier by indicating a termination point of data transmission in a transmitting device, wherein the apparatus comprises:
at least one processor;
at least one memory including computer program code, the at least one memory and the computer program code configured to, with the at least one processor, cause the apparatus to:
transmit downlink control information to a receiving device in a first subframe; and
transmit downlink control information to the receiving device; and
generate the downlink control information;
wherein the downlink control information includes an indication of a point within the first subframe and before a subframe boundary of the first subframe where the data in the first subframe terminates.

14. The apparatus of claim 13, wherein the at least one memory and the computer program code configured to, with the at least one processor cause the apparatus to:
determine a value for a symbol index of the termination point of the data in the first subframe according to a mapping relationship configured in advance by higher-layer signaling or predetermined specification.

15. A User Equipment for data reception on a first carrier, wherein the User Equipment comprises:
at least one processor;
at least one memory including computer program code, the at least one memory and the computer program code configured to, with the at least one processor, cause the User Equipment to at least:
receive data on the carrier in a first subframe and downlink control information; and
decode the downlink control information;
wherein downlink control information includes a termination point indication for indicating a point within the first subframe and before a subframe boundary of the first subframe where the data in the first subframe terminates.

16. The User Equipment of claim 15 wherein the at least one memory and the computer program code are further configured to, with at least one processor, cause the User Equipment to:
discard values received in the first subframe that were located after the indicated point in the first subframe.

17. The User Equipment of claim 15, wherein the downlink control information is received in a control message via physical downlink control channel (PDCCH) or an enhanced physical downlink control channel (EPDCCH).

18. The User Equipment of claim 15, wherein the data is received via a physical downlink data channel (PDSCH).

* * * * *